United States Patent Office.

JOHN G. STUTTZ, OF SAN DIEGO, CALIFORNIA.

COLORED FIRE.

SPECIFICATION forming part of Letters Patent No. 415,479, dated November 19, 1889.

Application filed December 24, 1888. Serial No. 294,489. (No specimens.)

*To all whom it may concern:*

Be it known that I, JOHN GEORGE STUTTZ, of San Diego, in the county of San Diego and State of California, have invented a new and Improved Body for Illuminating or Colored Fire, of which the following is a full, clear, and exact description.

This invention relates to a compound constituting a body for illuminating or colored fires, said body being applicable for all theatrical purposes and effects, amateur performances, public demonstrations, secret societies, torch-light and other processions, signal-service uses, distress-signals, &c.

My composition consists of the following ingredients, combined substantially in the proportions stated, viz: chlorate of potash, eight ounces; gum-shellac, four ounces; gum-camphor, (pulverized,) one-half ounce; brass filings, one-fourth ounce; magnesia, one-eighth ounce; alcohol, one pint.

In combining the above ingredients the shellac is ground and mixed with alcohol, and when entirely dissolved the other ingredients are introduced and the whole heated in a crucible to 200° Fahrenheit. After the compound has evaporated one-half the mass is allowed to cool, and is molded to any form required—such as pencils, tablets, &c.—phosphorus being attached, if deemed desirable.

To the above compound I add ingredients to produce any desired colored fire. For making red fire I would add to the above one pound of nitrate of strontia.

The above compound makes a hard compact mass that is perfectly harmless in burning, creates little or no smoke during or after burning, and withal is a good disinfectant, and will burn longer, brighter, and stronger than any similar composition.

The pencils or tablets formed from my composition may be easily lighted, but will not ignite spontaneously, and the composition is not affected by the weather or change, and has little or no odor in burning and no waste in using.

What I claim, and desire to secure by Letters Patent, is—

1. The herein-described colored-fire composition, consisting of chlorate of potash, gum-shellac, gum-camphor, (pulverized,) brass filings, and magnesia, combined in about the proportions specified.

2. The herein-described colored-fire composition, consisting of chlorate of potash, gum-shellac, gum-camphor, (pulverized,) brass filings, magnesia, and nitrate of strontia, in about the proportions specified.

J. G. STUTTZ.

Witnesses:
MORRIS BRINN,
J. J. CHARLIER.